Patented Sept. 3, 1935

2,013,090

UNITED STATES PATENT OFFICE 2,013,090

ORGANIC COLORING MATERIAL COMPRISING AZO COMPOUNDS AND HYDROGENATED ROSINS

Archibald M. Erskine, Chatham, and Alfred Siegel, Hillside, N. J., assignors to Krebs Pigment & Color Corporation, Newark, N. J., a corporation of Delaware No Drawing. Application October 16, 1933, Serial No. 693,821

8 Claims. (Cl. 134—58.5)

The present invention relates to azo lakes and pigments which contain as the substratum an insoluble metallic salt of a hydrogenated rosin and process of making the same.

It has been shown in U. S. Re—18,590 that the development of azo lakes and pigments when carried out in the presence of metallic rosinates produces novel products in which the rosinate acts as a non-diluting substratum, and which have exceedingly valuable tinctorial properties.

We have found that similar results are obtained when the lake development is carried out in the presence of an insoluble salt of a hydrogenated rosin.

Rosin is composed to a large extent of abietic acid which is chemically unsaturated. One obtains by hydrogenation of rosin or of abietic acid dihydro and tetrahydro abietic acids, the hydrogenation being carried out by the procedure in U. S. Patent 1,167,264 and the product refined in accordance with U. S. Patent 1,899,961. The characteristic difference between the ordinary, unsaturated rosin and the hydrogenated product is best shown by their iodine numbers, the former running ordinarily from 170 to 185, or even higher, whereas the latter will vary from 9 to 50, the usual range being 18 to 20.

By the term development, we refer to that well known practice in manufacturing lakes which consists essentially in heating or boiling the color after its various components have been incorporated with each other. This operation produces a change in the physical and chemical properties of the azo compound, whereby the combination of the azo compound and the substratum takes place and the full tinctorial value of the pigment is obtained.

The hydrogenated rosin or hydrogenated abietic acid is used in our invention in the form of a metallic, water insoluble salt. Alkaline earth and heavy metal salts of hydrogenated rosin are substantially water insoluble and are adapted for incorporation into azo lakes or pigments according to our invention. We employ, for instance, calcium, barium, aluminum, zinc, lead, etc., salts of hydrogenated abietic acid as the non-diluting substrata in the preparation of our azo lakes and compounds.

The amount of such substrata can vary within wide limits; the color improvement takes place when small amounts of say, for instance, 5% of the salt is incorporated in the lake. Larger amounts, say up to, for instance, 50% of the finished product, produce similar color improvements without substantially decreasing the strength of the products. As a matter of fact, with amounts of 25 to 35% about the same tinctorial value is obtained as with lakes or pigments prepared with a few per cent of the substratum only, though the weight yield is considerably larger.

The essential step in the process of our invention is the development of the lake or pigment in the presence of a water insoluble hydrogenated abietic acid salt. It is sometimes advisable to add to this development step a small amount of a dispersing agent of which sulfonated vegetable or sulfonated animal oils, such as Turkey red oil, sulfonated castor oil, sulfonated cotton seed oil, sulfonated fish oil, etc. are representative commercial products. The development is generally carried out in neutral or alkaline medium.

The incorporation of our novel substrata and/or their transformation into insoluble salts can take place at any desired step of the process, which except as to the development in the presence of our novel substrata follows usual practice in the preparation of azo lakes or pigments.

We can, for instance, add the water soluble alkali metal salts of the hydrogenated rosin to either the diazo compound or to the coupling compound, and after formation of the azo coloring compound jointly precipitate the azo compound and the substratum with an alkaline earth metal or heavy metal salt or separately prepare the insoluble salt of the hydrogenated abietic acid and add it to the insoluble azo compound at any step of its preparation and finish the lake or pigment by development, or we can prepare the suspension of the insoluble azo compound and the insoluble substratum in any desired manner as will be evident to those skilled in the art.

Our invention is applicable to various types of azo dyestuffs of the following three types, which are capable of being transformed into pigments.

*Mono-azo monosulfonic acids.*—The sulfonic acid group is usually and preferably located in the first or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).

2. Diazotized para-nitraniline ortho-sulfonic acid with beta naphthol (Lake red P, Colour Index No. 158).

3. Diazotized 2-naphthylamine 1-sulfonic acid with salicylic acid.

4. Diazotized para-toluidine meta-sulfonic acid with the anilide of beta-oxynaphthoic acid.

*Mono-azo monocarboxylic acids.*—The carboxylic acid group may be in either component and the component not containing the carboxylic acid group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine meta-sulfonic acid with beta-oxynaphthoic acid (Lithol Rubine, Colour Index No. 163)
2. Diazotized para-nitro ortho-toluidine with beta-oxynaphthoic acid
3. Diazotized anthranilic acid with beta naphthol (Lake red D, Colour Index No. 214)
4. Diazotized 2-naphthylamine 1-sulfonic acid with beta-oxynaphthoic acid (Lake Bordeaux B, Colour Index No. 190)

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44)
2. Diazotized meta-nitro para-toluidine with aceto-acetanilide (Hansa yellow G)
3. Diazotized para-nitro ortho-toluidine with beta naphthol (Pigment orange R, Colour Index No. 68)
4. Diazotized alpha-naphthylamine with beta naphthol (Autol red RL, Colour Index No. 82)

For convenience's sake and to follow usual commercial and industrial practice we use the term beta-oxynaphthoic acid herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc., or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine meta-sulfonic acid with beta-oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

Our novel lakes and pigments are characterized chemically by containing a substantial amount of a substratum which comprises an insoluble salt of hydrogenated abietic acid. In tinctorial properties the lakes and pigments produce clearer, brighter shades with less bronziness in the prints made therefrom. They also have in general a greater strength than corresponds to the amount of the azo compound contained therein and a greater strength than similar lakes and pigments containing an inorganic substratum.

The following are a few examples of lakes and pigments prepared according to our invention. It will be understood that the manipulations in these preparations can be varied to a large extent; that other azo compounds or other salts of the azo compound and the hydrogenated abietic acid will produce similar results.

*Example I.*—A solution of the sodium salt of 2-naphthylamine 1-sulfonic acid corresponding to 111.5 parts of the free acid, is diazotized in the usual manner with 39 parts of sodium nitrite and 204 parts of muriatic acid 20° Bé. In a separate container a solution of 80 parts of beta naphthol and 51 parts of caustic soda is prepared and made to a volume corresponding to approximately 2500 parts of water. After the temperature of this solution has been adjusted to 25° C., the diazo suspension referred to above, is introduced into the beta naphthol solution. The coupling proceeds rapidly and to good completion. It is evident from the amounts of ingredients stated above, that the azo reaction is completed in an alkaline condition. The charge is then heated to 40° C.

To a solution of 30 parts of caustic soda in 325 parts of water is added 75 parts of hydrogenated rosin. The volume is then brought to the equivalent of approximately 1900 parts of water, the preparation boiled to complete the saponification. This preparation of hydrogenated rosin salt is then run into the charge of the azo dyestuff, described above, and the temperature and volume of the combining solutions so adjusted that the temperature of the resulting charge does not drop below 40° C.

It will be evident from the above figures that the reaction mixture contains at this point alkali equal to 0.29 mol NaOH per mol dyestuff. It shows an alkaline reaction to brilliant yellow test paper.

The charge is then precipitated with a solution of 240 parts of barium chloride in 5,000 parts of water at the boil, boiled to insure development of the lake, and the product then washed, filtered, dried, and ground in the usual manner.

The yield is approximately 325 parts of dry product compared to 245 parts in a charge prepared without hydrogenated rosin salt. The difference is constituted by the hydrogenated rosin substratum contained in the lake. The hydrogenated rosin lake is equal in covering power (determined by tinting in white) to the product obtained without the use of hydrogenated rosin salt, and is equal in this respect to the ordinary commercial barium lithol toner. It is much brighter in shade, cleaner in tone and when ground into litho varnish to produce a printing ink, the latter product gives a print which possesses a bright, fiery, bronze-free tone. In other words, this new product possesses the strength of a toner and the printing quality of a lake.

*Example II.*—A solution of 41.8 parts of the sodium salt of para-toluidine meta-sulfonic acid

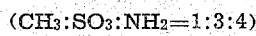

is diazotized with 14.4 parts of nitrite of soda and 52 parts of 20° Bé. muriatic acid.

40 parts of beta oxynaphthoic acid

are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then reslurried to 16,800 parts of water at 40° C. To this are added 9.6 parts of para soap in 50 parts of water. In a separate container 32 parts of hydrogenated rosin are added to a solution of 6.5 parts of caustic soda in 400 parts of water, and the solution boiled until the formation of the soluble hydrogenated rosin salt is complete. This hydrogenated rosin solution is then added to the dye solution and the temperature adjusted to 40° C. and stirred 15 minutes.

In a separate container 80 parts of calcium chloride are dissolved in 2000 parts of water and the temperature adjusted to 27° C. and into this is then run in 10 minutes the dye and soap solution. There is then added 41 parts of caustic soda in 5000 parts of water which is 4.2 mols NaOH per mol dyestuff, and the slurry is stirred for 15 minutes. The charge is then heated to the boil and digested at this temperature for ½ hour, after which it is washed, filtered, and dried in the usual manner. The yield is approximately 132 parts of pigment compared with 92 parts in a charge carried out in exactly the same way but without the hydrogenated rosin.

The new pigment contains a substantial amount of a hydrogenated rosin substratum and has an excellent strength, shade and other pigmenting properties.

*Example III.*—69 parts of para-nitro-aniline are dissolved in 60 parts of muriatic acid (100%) and 300 parts of water at 80–90° C. and the solution is then allowed to flow in a fine stream onto 625 parts of ice and water with good stirring. The resulting suspension is then diazotized in the usual manner with 37.5 parts of sodium nitrite, after stirring approximately 20 minutes, the diazo preparation is partially neutralized with 25 parts of whiting and the stirring continued for 15 minutes.

To a solution of 7 parts of caustic soda in 500 parts of water is added 37.5 parts of hydrogenated rosin and boiled ½ hour. This solution is then added to a solution of 25 parts of barium chloride in 1225 parts of water at the boil and boiled 15 minutes. Previously, to a solution of 26 parts of caustic soda and 26 parts of soda ash (98%) in 400 parts of water is added 71.5 parts of betanaphthol and the mixture heated until a clear solution is obtained. To this solution is also added a mixture of 6.5 parts of para soap in 65 parts of water, and the resulting solution is added in a fine stream to the barium salt of hydrogenated rosin. The temperature and volume of the resulting mixture is adjusted to 15° C. and 2900 parts of solution, and the above diazo solution is run in whereupon the azo coupling proceeds quickly and smoothly to completion. After stirring a short time the dyestuff is brought rapidly to the boil and boiled five minutes, the product is then flooded, washed, and dried in the usual manner.

The yield is approximately 208 parts of pigment compared with 160 parts in a charge carried out in exactly the same way but without the hydrogenated rosin soap. The pigment contains about 23% of the barium salt of hydrogenated rosin as an organic substratum.

The new lake pigment has good strength, a clean bright printing tone, and good texture.

*Example IV.*—A solution of para nitro-orthotoluidine is prepared by dissolving 77.5 parts of para-nitro-toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

145 parts of the anilide of beta oxynaphthoic acid (OH:CONHC₆H₅=2:3) are dissolved in a solution of 43 parts of caustic soda and 500 parts of water. To this are added 70 parts of sodium acetate, and after stirring the solution there is further added 15 parts of para soap in 125 parts of water and then 37.5 parts of hydrogenated rosin dissolved in a solution of 7 parts of caustic soda and 500 parts of water, boiled until saponification is complete. The resulting solution is adjusted to 5000 parts of solution at 40° C., and the above diazo preparation run in rapidly. This is followed by a solution of 30.5 parts of caustic soda in 375 parts of water, and the entire mixture is brought to 40° C. in twenty minutes, at which temperature the azo coupling proceeds rapidly to completion. After stirring a few minutes the dyestuff is made to 40,000 parts of solution at 27° C. and acidified with 1215 parts of glacial acetic acid. After this there is added in 10 minutes a solution of 75 parts of calcium chloride in 500 parts of water. There is then added 20.5 parts of caustic soda in 250 parts of water and the slurry stirred for 15 minutes. The charge is then developed by heating to the boil and digested at this temperature for ½ hour, after which it is washed, filtered, and dried in the usual manner.

The yield is approximately 249 parts of pigment compared with 218 parts in a charge carried out in exactly the same way but without the hydrogenated rosin soap. The pigment contains about 12% of the calcium salt of hydrogenated rosin as an organic substratum. The lake pigment possesses the characteristic tinctorial properties with good strength and texture.

*Example V.*—A mixture of 76 parts of meta-nitro-para toluidine and 825 parts of water is pulped until a creamy paste is obtained. This paste is diazotized with 38 parts of sodium nitrite and 54 parts of muriatic acid (100%) in the usual manner and the diazo preparation is allowed to stir for one and one-half hours.

In a separate container a solution of 79 parts of beta naphthol and 24 parts of caustic soda is prepared and made to a volume corresponding to approximately 2500 parts of solution at 33° C. To this is added a mixture of 4.7 parts of para soap in 60 parts of water, a solution of 85 parts of sodium acetate in 500 parts of water, a solution of 56 parts of sodium bicarbonate in 625 parts of water, and finally, a solution made by boiling 17.5 parts of hydrogenated rosin in a solution of 3 parts of caustic soda and 375 parts of water until saponification is complete. The resulting solution is adjusted to 5600 parts of solution at 35° C. and the above diazo preparation is added in 1 hour, the azo coupling proceeds rapidly to completion. The dyestuff is stirred for fifteen minutes, and then the slurry is struck with a solution of 13 parts of calcium chloride in 625 parts of water and the stirring continued for an additional 15 minutes. The product is then washed, filtered, and dried in the usual manner.

The yield is approximately 174 parts of pigment compared to 155 parts in a charge prepared without the hydrogenated rosin salt. The pigment contains about 11% of the calcium salt of hydrogenated rosin as an organic substratum. The tinctorial properties are those of a lake of good strength.

*Example VI.*—A mixture of 68.5 parts of anthranilic acid and 1125 parts of water are stirred to a thin paste, and 22.5 parts of muriatic acid (100%) are added. The resulting solution is iced to 3° C. and diazotized in the usual manner with 37 parts of sodium nitrite.

75 parts of beta naphthol are dissolved in a solution of 33 parts of caustic soda and 400 parts of water. In a separate container 37.5 parts of hydrogenated rosin are added to a solution of 7 parts of caustic soda in 750 parts of water, and the solution boiled for ½ hour. The resulting soap solution is then added to the beta naphthol solution, and the solution is adjusted to 3000 parts of solution at 18° C. The diazo preparation is run in beneath the surface in ½ hour and stirred until the azo coupling is completed. The dyestuff is then allowed to stand over-night, and the following day it is made to 10,000 parts of solution at 25° C. This slurry is struck in 10 minutes into a solution of 150 parts of barium chloride in 5000 parts of water at 25° C. After 15 minutes stirring, it is adjusted to 25,000 parts of solution and slowly brought to 140° C. and maintained at this temperature for ½ hour, after which it is washed, filtered, and dried in the usual manner.

The yield is approximately 207 parts of pigment compared with 169 parts in a charge carried out in exactly the same way but without the hydrogenated rosin soap. The pigment contains about 13% of the barium salt of hydrogenated rosin as an organic substratum. The lake pigment possesses the usual tinctorial properties of a lake.

*Example VII.*—A mixture of of 68.5 parts of anthranilic acid and 1125 parts of water are stirred to a thin paste, and 22.5 parts of muriatic acid (100%) are added, the resulting solution is iced to 3° C., and diazotized in the usual manner with 37 parts of sodium nitrite.

99 parts of beta oxynaphthoic acid (OH:COOH=2:3) or dissolved in a solution of 46 parts of caustic soda and 500 parts of water. The temperature and volume of the beta oxynaphthoic acid solution is adjusted to 15° C. and 3000 parts of solution, and the above described diazo preparation is then run in whereupon the azo coupling proceeds to completion. The dye slurry is made to 13,000 parts of solution at 40° C. and to this is added to a solution prepared by adding 75 parts of hydrogenated rosin to a solution of 14 parts of caustic soda in 1500 parts of water, and boiling for ½ hour. After stirring a short time the dye slurry is precipitated by running it into a boiling solution of 200 parts of calcium chloride and 5000 parts of water, boiled 20 minutes to insure development, and then washed, filtered and dried in the usual manner.

The yield is approximately 205 parts of dry product compared to 180 parts in a charge prepared without the hydrogenated rosin soap. The lake pigment contains about 12% of the calcium salt of hydrogenated rosin as the substratum and possesses the desirable characteristic of a clean, yellow printing tone.

*Example VIII.*—A solution of para-nitro-toluidine is prepared by dissolving 77.5 parts of para-nitro-toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

104 parts of beta oxynaphthoic acid (OH:COOH=2:3) are dissolved in a solution of 23 parts of caustic soda and 1000 parts of water. An additional 59 parts of caustic soda dissolved in 700 parts of water are added and the volume and temperature adjusted to 2500 parts of solution at 20° C. The above described diazo preparation is then run in whereupon the azo coupling proceeds to completion. The dye slurry is made to 13,000 parts of solution at 40° C. and to this is added a solution prepared by dissolving 75 parts of hydrogenated rosin a solution of 12 parts of caustic soda in 1000 parts of water at the boil and boiling for ½ hour. After stirring a short time the dye slurry is precipitated by running it into a boiling solution of 200 parts of calcium chloride and 5000 parts of water, boiled 20 minutes to insure development, and then washed, filtered and dried in the usual manner.

The yield is approximately 280 parts of dry product compared to 205 parts in a charge prepared without hydrogenated rosin. The lake pigment contains about 27% of the calcium salt of hydrogenated rosin as the substratum and is brighter in shade, cleaner and more bronzy in tone, and of good strength and texture.

*Example IX.*—A mixture of 100 parts of the sodium salt of the dyestuff 6-sulpho 4-chloro-3 toluene azo beta naphthol is pulped until a creamy paste is obtained with 1000 parts of water. The volume and temperature of the dyestuff slurry is then adjusted to 6000 parts of suspension at 25° C. In a separate container 18 parts of hydrogenated rosin are added to a solution of 4.5 parts of caustic soda in 400 parts of water and boiled until the formation of the soluble hydrogenated rosin soap is complete. The hydrogenated rosin soap solution is then added to a boiling solution of 12 parts of calcium chloride in 1200 parts of water and boiled to complete the formation of the insoluble metallic soap. This insoluble calcium salt of hydrogenated rosin is then added to the above dyestuff slurry and stirred until a thoro mixture is obtained. A solution of 8 parts of boric acid in 160 parts of water is then added. After stirring a short time the dyestuff slurry is brought to 90° C. and the volume adjusted to 10,000 parts of suspension, it is then slowly added to a solution of 100 parts of barium chloride in 4000 parts of water at 90° C., and after being quickly brought to the boil, boiled 15 minutes, to insure completion of the development, after which, it is washed, filtered, and dried in the usual manner.

The yield is approximately 131 parts of dry product compared to 113 parts in a charge carried out in exactly the same way but without any hydrogenated rosin soap. The lake pigment contains about 14% of the calcium salt of hydrogenated rosin, and possesses the usual tinctorial properties.

*Example X.*—A mixture of 76 parts of meta-nitro-para-toluidine and 825 parts of water is pulped until a creamy paste is obtained. This paste is diazotized with 37.5 parts of sodium nitrite and 55 parts of muriatic acid in the usual manner and the diazo preparation is allowed to stir for one and one-half hours.

A solution of 93 parts of aceto-acetanilid in 1250 parts of water is prepared by heating to 85° C. and allowed to cool to 70° C. 170 parts of sodium acetate is then added and stirred at 70° C. until dissolved. A suspension of the barium salt of hydrogenated rosin is prepared separately by dissolving 60 parts of hydrogenated rosin in a solution of 12.25 parts of caustic soda and 1250 parts of water and boiling ½ hour. This hydrogenated rosin soap solution is then added to a boiling solution of 40 parts of barium chloride and 4000 parts of water in 15 minutes and boiled 15 minutes. The resulting barium salt of hydrogenated rosin is flooded with ice and water, allowed to stand over-night and the supernatant liquid removed. The slurry of the barium salt of hydrogenated rosin is added slowly to the solution of aceto-acetanilid and the temperature maintained at 70° C. The volume of the mixture of aceto-acetanilid and the barium salt of hydrogenated rosin is made to 7500 parts and the temperature adjusted to 25° C. The above described diazo preparation is now added in one hour and the coupling proceeds rapidly and to good completion. After stirring one hour, the product is filtered, washed, and dried at 60° C.

The yield is approximately 230 parts of pigment compared with 165 parts in a charge prepared in exactly the same way but without the barium salt of hydrogenated rosin. The resulting pigment is very much cleaner and more brilliant in undertone and gives cleaner tints on extension with white compared with the product prepared without barium salt of hydrogenated rosin. The product containing the barium salt of hydrogenated rosin is also more transparent and higher in oil absorption and finish. Printing tests show that the treated product possesses a very characteristic and desirable high finish which is an improvement over ordinary Hansa yellow.

We claim:

1. In a process of preparing azo lakes and pigments the step of developing an aqueous suspension of an azo coloring compound in the presence of an insoluble salt of hydrogenated abietic acid.

2. In a process of preparing azo lakes and pigments the step of developing by heating an alkaline, aqueous suspension of an insoluble azo coloring compound and an insoluble salt of hydrogenated rosin.

3. A lake or pigment comprising an azo coloring compound combined with a substratum comprising an insoluble salt of hydrogenated abietic acid.

4. A lake or pigment comprising a water insoluble azo coloring compound combined with a substratum comprising a water insoluble hydrogenated rosin salt.

5. A lake or pigment comprising a water insoluble alkaline earth metal salt of an azo compound combined with a substratum comprising an alkaline earth metal salt of hydrogenated rosin.

6. A lake or pigment comprising a water insoluble salt of the azo compound obtained by coupling diazotized 2-naphthylamine 1-sulfonic acid with beta naphthol, combined with a substratum comprising an alkaline earth metal salt of hydrogenated rosin.

7. A lake or pigment comprising a water insoluble salt of the azo compound obtained by coupling diazotized para-toluidine metasulfonic acid with beta oxynaphthoic acid, combined with a substratum comprising an alkaline earth metal salt of hydrogenated rosin.

8. A lake or pigment comprising the azo compound obtained by coupling diazotized meta-nitro-para-toluidine with aceto-acetanilid combined with a substratum comprising an alkaline earth metal salt of hydrogenated rosin.

ARCHIBALD M. ERSKINE.
ALFRED SIEGEL.